Figure 1:
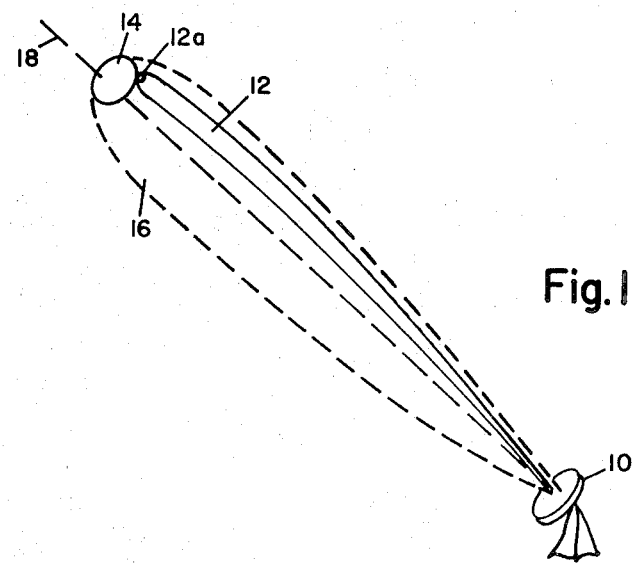

United States Patent

[11] 3,618,091

[72] Inventor   Jesse L. Butler
                Nashua, N.H.
[21] Appl. No.  151,529
[22] Filed      Nov. 10, 1961
[45] Patented   Nov. 2, 1971
[73] Assignee   Sanders Associates, Inc.
                Nashua, N.H.

[54] CONICAL ANTENNA SYSTEM
     24 Claims, 7 Drawing Figs.
[52] U.S. Cl. .................................. 343/16 M,
     343/701, 343/756, 343/761, 343/763, 343/781,
     343/785
[51] Int. Cl. ................................... G01s 9/22
[50] Field of Search .......................... 343/701,
     757–766, 844, 854, 876, 100.11, 16, 16.1, 7.4;
     325/24

[56] References Cited
     UNITED STATES PATENTS

| | | | |
|---|---|---|---|
| 2,659,006 | 11/1953 | Herb | 343/16 |
| 3,026,513 | 3/1962 | Kurtz | 343/7.4 |
| 2,881,432 | 4/1959 | Hatkin | 343/762 X |
| 2,942,260 | 6/1960 | Carter | 343/762 X |
| 3,048,844 | 8/1962 | Ashley | 343/16 X |

Primary Examiner—T. H. Tubbesing
Attorney—Louis Etlinger

ABSTRACT: An antenna system comprising, in combination, antenna means radiating a single stationary beam pattern during transmission of energy said antenna means including means for receiving first and second overlapping beams within said first pattern, first and second transmission paths arranged to be energized upon reflections of said transmitted energy exclusively by signals in said first and second beams respectively, transmission means for coupling signals received by said antenna means to said transmission paths, and means for causing said overlapping beams to trace said directional pattern.

PATENTED NOV 2 1971 3,618,091

SHEET 1 OF 2

Jesse L. Butler
INVENTOR
Robert O. Richardson
ATTORNEY

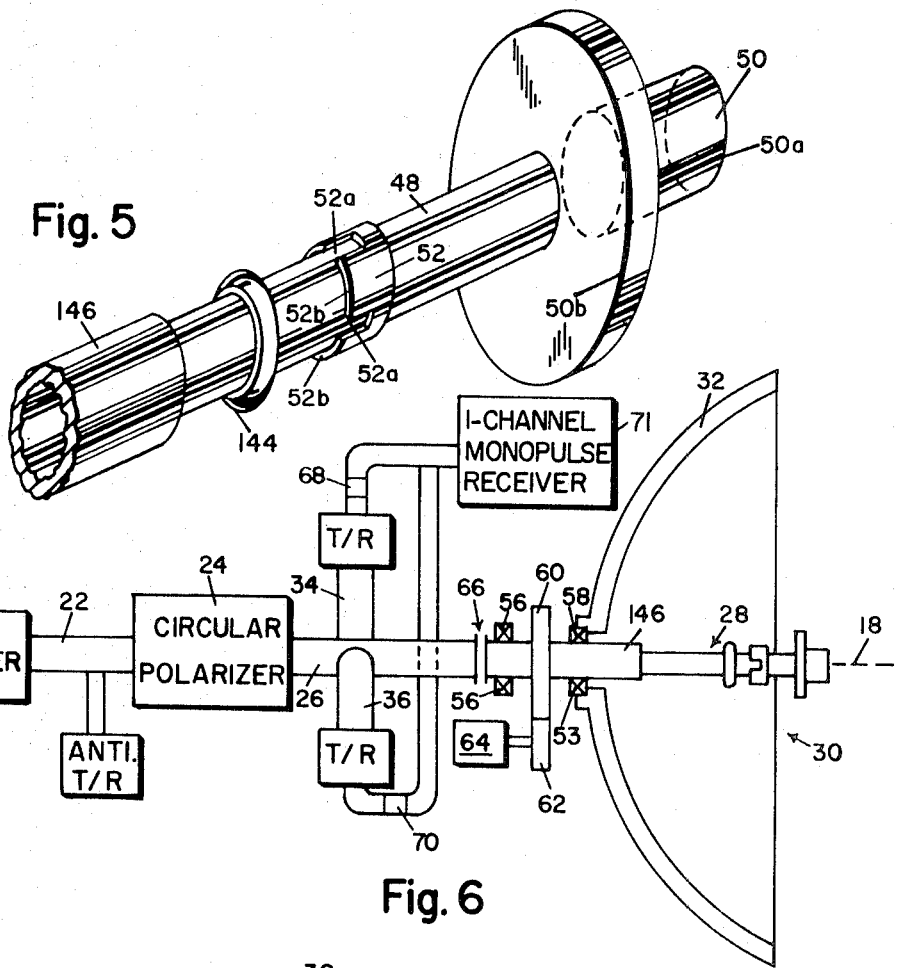
Fig. 5
Fig. 6
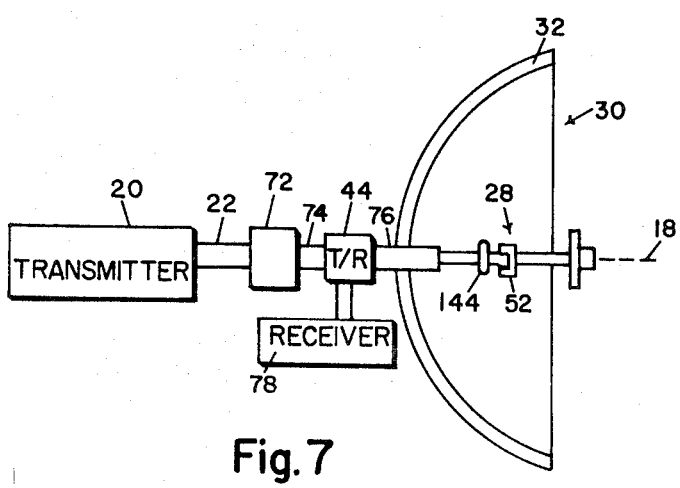
Fig. 7
Jesse L. Butler
INVENTOR
Robert O. Richardson
ATTORNEY

CONICAL ANTENNA SYSTEM

This invention relates to an improved radar system and to a novel antenna incorporated therein. The antenna radiates a stationary beam and yet scans in a conical pattern during reception of reflected signals. The system simultaneously receives from points spaced b 180 degrees apart in the conical pattern to function as a conically scanning monopulse radar that obtains accurate target information at a rapid rate from a large area in space.

The present antenna system is particularly useful for detecting and locating airborne objects by transmitting a continuous succession of energy pulses and receiving, during the intervals intermediate the pulses, echo signals reflected from the objects. In conical scanning, which is often used to accurately determine the angular location of an object with respect to the antenna, an antenna beam of circular cross section is continuously steered so that its axis describes a cone having an apex at the antenna. If an object lies on the axis of the cone, the "boresight axis," the angle between the beam axis and the line to the object remains constant in spite of the rotary motion of the antenna beam. Accordingly, the strength of the echo signal is constant. If the object lies to one side of the boresight axis, the amplitudes of successive echo pulses in the received signal increase and decrease during each sweep around the cone. To determine the angular position of the object, the antenna is turned until the conical scan causes no variation in the strength of the received signal. The object is then accurately aligned on the boresight axis.

In the prior art, conical scanning is achieved by physically moving the antenna in a circular path or by electronically displacing the beam of an antenna which does not move in such a path. Several antennas for the latter operation are described in U.S. Pat. Nos. 2,821,707, 2,878,470 and 2,878,471, in which the transmitted beam scans a conical pattern. However, a serious problem results from the fact that an object illuminated by the beam can receive the transmitted signal and apply countermeasure techniques to prevent the operator of the radar from determining the position of the object. More specifically, the signal received by the object is amplitude-modulated because of the rotary motion of the beam, and the object can transmit countermeasure signals appropriately synchronized with the amplitude modulation.

Furthermore, as explained above, the angular location of an object is determined in a conical scanning system by comparing the amplitudes of successive echo signals. However, the reflected signals are generally cluttered with noise resulting from amplitude variations between transmitted pulses, changing atmospheric conditions, propeller and exhaust modulation and changes in the aspect of the object with respect to the antenna. These noise variations in the received signal strength reduce the effective sensitivity as well as the accuracy of the system.

In the more recently developed amplitude-sensing monopulse system ("Amplitude—And Phase—Sensing monopulse System Parameters," Part 1, Cohen & Steinmetz, Microwave Journal, Oct. 1959, pp. 27–33), two overlapping beams are received simultaneously and the signals are combined to provide sum and difference signals from which the angular location of an object is determined from each pulse. In other words, the monopulse system does not compare successive pulses to determine the object's location. Hence, the problems caused by noise variations between successive echo pulses are avoided. However, prior monopulse systems do not scan a large area. Coverage in both azimuth and elevation requires lobe-switching with a complex antenna array. In addition, the prior monopulse systems require two or more antennas and elaborate circuits to detect and combine the signals from the several antennas.

Accordingly, it is a principal object of the present invention to provide an improved radar system. A more specific object is to provide a monopulse radar capable of scanning in both azimuth and elevation.

Another object of the invention is to provide an antenna system for detecting and locating objects rapidly and with high frequency.

A further object is to provide an improved radar antenna having high angular resolution.

Still another object of this invention is to provide a radar system that combines the advantages of monopulse radar with conical scan radar.

Yet another object of the invention is to provide a conical scan radar system that is fee from spurious amplitude variations in received signals.

Still another object of this invention is to provide an antenna system of the above description that requires fewer components than prior radar systems having high angular resolution.

A further object of this invention is to provide an improved radar antenna.

Yet another object is to provide a scanning antenna that is less vulnerable to countermeasures than prior scanning antennas.

Other objects of the invention will in part be obvious and will in part appear hereinafter.

Figure 2:
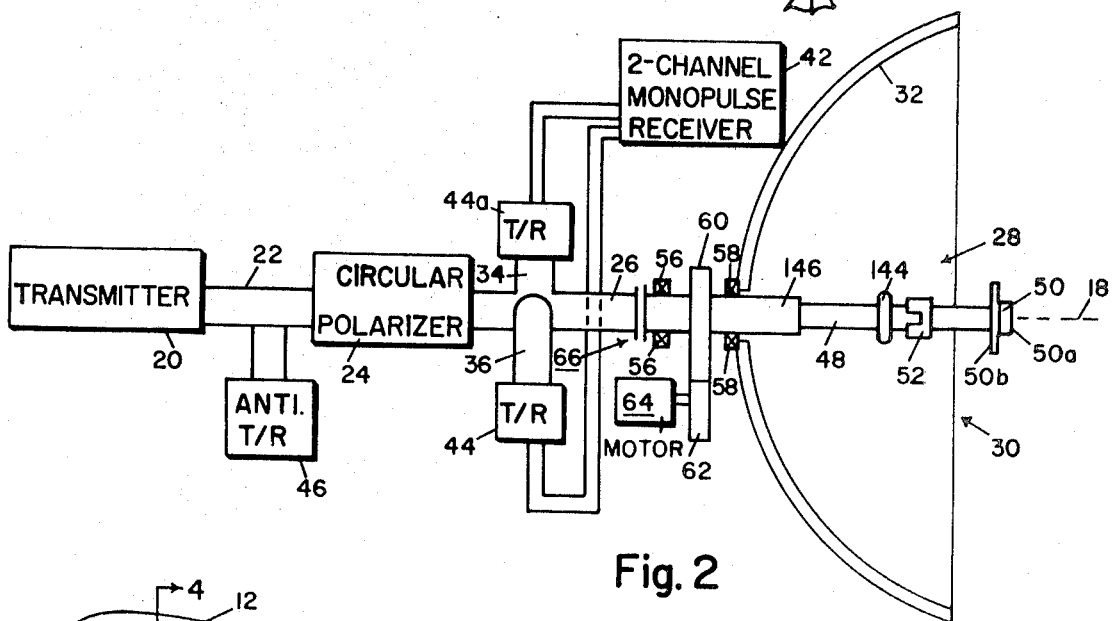
Figure 3:
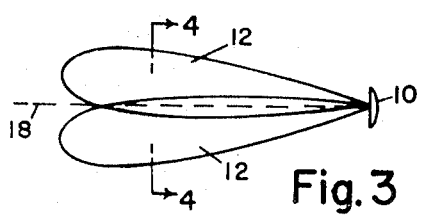
Figure 4:
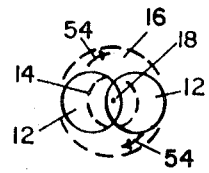

For a fuller understanding of the nature and objects of the invention, reference should be had to the following detailed description, taken in connection with the accompanying drawings, in which:

FIG. 1 is a pictorial representation of a conical scan antenna system,

FIG. 2 is a side view, broken away and partly in schematic form, of a radar system embodying the invention, FIG. 3 is a side view of the radiation pattern received with the system of FIG. 2, FIG. 4 is a transverse section taken along line 4—4 of FIG. 3, FIG. 5 is an enlarged perspective view of a portion of the antenna incorporated in the system of FIG. 2, FIG. 6 is a side view, broken away and partly in schematic form, of another radar system embodying the present invention, and FIG. 7 is a side view, partly broken away, and partly in schematic form, of a conical scanning system embodying the invention.

In general, the present radar system includes an antenna that transmits circularly polarized energy in a pattern that is stationary with respect to the antenna boresight axis. The antenna receives reflected signals from a beam that sweeps through a conical pattern at an extremely rapid rate, and the polarization angle of the received signal changes as the received beam sweeps this pattern.

The fields generated by two orthogonally polarized components of the received signal reproduce, in two branch transmission lines, two selected signals arriving from beams spaced 180° degrees apart in the conical pattern. In other words, two signals, each having a selected polarization angle, are extracted from the received energy and detected separately. The two signals arrive from diametrically opposite points on the conical pattern and thus they compose a pattern similar to that received with a conventional amplitude-sensing monopulse radar.

However, in the present system the two polarizations of the receiver are jointly rotated, and thus the received two-beam pattern scans the entire conical pattern. The two selected signals are combined in sum and difference channels to determine, according to well-known techniques, the direction, from the radar boresight, of the object from which the received signals are reflected. In this manner, the system searches a full conical pattern with a single antenna to locate objects anywhere within the pattern.

More specifically, referring to FIG. 1, a conical scan antenna system generally comprises an antenna 10 that illuminates, at any instant, a narrow beam 12. The antenna steers the beam 12 so that its tip 12a defines a circular path 14 and the beam 12 circumscribes a conical pattern 16 about a boresight axis 18.

Referring to FIG. 2, the present radar system comprises a transmitter 20 that delivers plane-polarized energy to a rectangular waveguide 22. A circular polarizer 24 transforms the transmitter energy to circularly polarized energy and delivers it via a circular waveguide 26 to a feed system, indicated generally at 28, of an antenna indicated at 30.

As describe below, the feed system 28 is excited by the transmitter energy and uniformly illuminates a parabolic reflector 32 which transmits a beam of circularly polarized energy that is stationary with respect to the antenna's boresight axis 18.

The reflector 32 focuses received echo signals, reflected from an object, on the feed system 28, and the latter generates a circularly polarized signal that is delivered to the circular waveguide 26. Waveguide branches 34 and 36, coupled to the waveguide 26, are energized selectively by two orthogonally polarized components of the circularly polarized signal in waveguide 26. The signal components in the branches 34 and 36 are fed to a two-channel receiver 42, which may be similar to a conventional receiver in an amplitude-sensing monopulse radar.

According to well-known techniques, transmit receive devices 44-44a are inserted in the waveguide branches 34 and 36 to isolate the receiver 42 from transmitter energy. Similarly, an antitransmit receive device 46 is connected to the rectangular waveguide 22 to prevent received signals from propagating to the polarizer 24 and transmitter 20, thereby achieving optimum transfer of such energy to the branches 34 and 36.

Still referring to FIG. 2, the antenna 30 is preferably similar to the antenna described in U.S. Pat. No. 2,878,470, except for the addition of a detuning device 144. As described in that patent, the antenna is provided with a radiating member that has a plurality of angularly displaced resonant stub portions and is disposed substantially at the focus of the reflector, so that received energy is focused on the member.

A received signal having a rotating electric field energizes the stub portions in succession to provide a conically scanned receiving pattern. During transmission of energy, the detuning device 144 essentially renders the stub portions nonresonant, so that the transmitted beam uniformly illuminates a cone centered about the boresight axis.

More specifically, the feed system 28 includes a circular waveguide 146 that extends through the reflector 1 and supports a dielectric rod 48. The rod 48 is electrically coupled at its opposite end to a secondary reflector 50. The reflector 50, shaped generally like a hat, has reflecting surfaces 50a and 50b that reflect energy propagating both within the rod 48 and along its surface, respectively. The reflecting surfaces are spaced apart so that the signals reflected from the reflector 50 are in phase and the reflector 50 is located to develop a standing wave having a maximum voltage at the focal point of the reflector 32. A circular radiating member 52 and the detuning device 144 are concentrically disposed on the rod 146 and axially spaced apart.

As shown in FIG. 5, the radiating member 52 is a metallic cylinder having three uniform axial slots 52a formed therein and uniformly spaced on its periphery 120° apart. The slots 52a, preferably a quarter wavelength deep at the operating frequency, electrically separate the member 52 into three resonant stub portions 52b, each of which is a half-wavelength long at the operating frequency.

Of particular significance in this invention is the detuning device 144, shown in FIGS. 2 and 5, which is a gaseous discharge device preferably in the form of a torroidal dielectric tube filled with hydrogen and water vapor. During transmission of energy from the antenna 30, the high energy level along the rod 48 ionizes the gas in the detuning element 144 so that the element appears as a torroidal conductor that effectively short circuits the slots 52a. As a result, the radiating member 52 appears unslotted and radiates energy to uniformly illuminate the reflector 32. The reflector, in turn, reflects a circularly polarized beam which is stationary and symmetrical with respect to the boresight axis 18.

The echo signals incident upon the reflector 32 are focused on the radiating element 52, but in this case, the electric field has insufficient strength to ionize the gas in the detuning element 144.

Thus, during the reception of echo signals as described in U.S. Pat. No. 2,878,470, each stub portion 52b is excited only by signal components having a selected polarization angle, i.e., extending tangentially along the stub portions. In addition, the stub portions 52b are displaced from the boresight axis 18 so that the energy focused on each stub portion is incident upon the reflector 32 (FIG. 2) from a direction skewed with respect to the axis 18. Thus, each stub portion 52b is primarily sensitive to energy arriving from a particular direction and having a particular polarization. Both the direction and polarization for each stub portion differ by 120° from each of the other stub portions. Furthermore, it will be apparent that for directions other than the three "preferred" directions, the member 52 will have polarization sensitivities for directions between the three 120° spaced angles. Thus, for each direction from which a signal may come, there is a unique polarization for which the antenna system has maximum sensitivity. Conversely, for each polarization there is a unique direction for the received signal.

Since the polarization of the transmitted energy continuously rotates, the receiver scans successive portions of space to trace out a conical pattern. The transmitted polarization rotates at a rate equal to the frequency of the transmitted signal, and the receiver scans at twice this rate. This follows from the fact that a polarization-sensitive device cannot distinguish between polarizations displaced by 180°. During a full 360° rotation of the polarization vector, each reflecting object is illuminated twice insofar as the receiver is concerned, one at a first angle, 0°, and again at an angle, 0°+180°.

Accordingly, since a 180° rotation of polarization covers a full 360° scan, points displaced in space by 180°, i.e., oppositely disposed with respect to the boresight axis 18, result in the return of signals having a polarization difference of 90° in the waveguide 46.

As described above, the waveguide branches 34 and 36 are coupled to the waveguide 26 by means of polarization-selective probes arranged to intercept signals whose electric fields are polarized 90° apart. Thus, the signals travelling up the waveguide branches 34 and 36 arrive from two beams, each of which is similar to the beam 12 (FIG. 1), displaced 180° apart in the conical pattern 16.

Referring to FIGS. 3 and 4, the two beams 12 exciting the waveguide branches overlap the boresight axis 18. This pattern is similar to that received with an amplitude-sensing monopulse radar system and, accordingly, the two signals in the waveguide branches can be delivered to comparison and receiving circuits of the type used in monopulse radar to locate the object from which the echo signals are reflected, and then shift the radar antenna to align the boresight axis 18 with the object.

In addition to achieving monopulse operation with a single antenna and single feed system, as just described, the present invention also operates to rotate the received signals in the waveguide 26 with respect to the polarization sensitivities of the waveguide branches 34 and 36. In effect, this causes rotation of the two beams received by the waveguide branches, whereby the branches 34 and 36 receive signals from the entire conical pattern. Rotation of the two beams 12 is indicated by the arrows 54 in FIG. 4.

More specifically, referring again to FIG. 2, bearings 56 and 58 support the circular waveguide 146 and the components of the feed system 28 secured thereto, and allow them to rotate with respect to the reflector 32 and the waveguide 26. A gear 60, keyed to the guide 146 meshes with a gear 62 driven by a motor 64. A rotary joint, indicated at 66, couples the rotating circular waveguide 146 to the stationary waveguide 26.

Rotation of the member 52 causes rotation of the stub portions 52b (FIG. 5) thereof. This shifts the polarization from each angular direction for which the antenna system is sensitive, and conversely it shifts the directions corresponding to the polarizations of signals transferred to the waveguide branches 34 and 36. From the tripartite symmetry involved, it will be apparent that a full rotation of the received beams occurs for every 120° movement of the feed system 28. In this manner, the radar system of FIG. 2 provides, with a single antenna, monopulse-type information from a large area that is rapidly scanned in both elevation and azimuth. The system thus provides substantially more information than prior monopulse systems and yet requires fewer components.

It should be noted that the two selected signals in branches 34 and 36 have a time phase differential between them. As described above, the two beams that generate the selected signals are polarized 90° apart, and, hence, the sector covered by one beam is illuminated by the transmitted energy one-fourth of its period before the sector covered by the other beam is illuminated. If desired, the time phase differential can be compensated, for example, with transmission paths of different electrical lengths between the waveguide 26 and the receiver 42.

FIG. 6 illustrates a radar system having the features provided with the system of FIG. 2 and, in addition, requiring only a single receiver channel. The single channel system includes RF switches 68 and 70 in the waveguide branches 34 and 36, which are connected by the switches to a receiver 71. The switches operate in sequence to couple the signals in the branches 34 and 36 alternately to the receiver 71. The signal input to the receiver contains substantially all the information received by the antenna regarding the location of the object from which the echo signals are reflected, combined on a time-sharing basis. Accordingly, only a single channel of comparator and receiver circuits is required to convert the detected signals to provide an accurate location of the object.

The antenna shown in FIG. 2 can also be used for a conventional conical-scanning operation in the system shown in FIG. 7. The transmitter 20 delivers plane polarized energy to a polarization gyrator 72 which rotates the polarization of the electric field at one-half the desired scan rate, a rate substantially lower than the frequency of the transmitter energy. The signal, with its rotating polarization, is coupled through circular waveguides 74 and 76 and the TR device 44 to the feed system 28 of the antenna 30. The TR device 44 isolates a receiver 78 from the transmitter energy and, during reception, couples substantially all received signals to the receiver. The gyrator 72, may, for example, be of the type described in the above-mentioned U.S. Pat. No. 2,878,470.

During transmission of energy by the antenna 30, the detuning element 144 is actuated by the transmitter energy and renders the radiating element 52 nonresonant, whereby the reflector 32 is uniformly illuminated and a beam of energy having a slowly rotating electric field is transmitted. Thus, the entire field of the radar is illuminated with energy of the same, though changing, polarization. Thus, the conical pattern 16 (FIG. 1) is simultaneously illuminated substantially uniformly with energy having a slowly rotating polarization.

During reception, with the detuning element 144 in the non-conducting state, the slowly rotating electric field of the reflected signal excites the member 52. For any given polarization, the feed system 28 discriminates in favor of energy coming from a unique sector of the transmitted beam. Thus, with rotation of the polarization, this sector, or narrow beam 12 (FIG. 1), rotates to scan a conical pattern 16 at twice the rate at which the gyrator 72 rotates the electric field.

In this manner, the radar system of FIG. 7 provides efficient conical scanning, and since the transmitted beam remains stationary with respect to the boresight axis, it overcomes the countermeasure's vulnerability exhibited by prior conical scan systems. The rotation of the electric field of the received signals with respect to the radiating element 52 can also be achieved by rotating the feed system 28 in the manner illustrated in FIGS. 2 and 6 instead of rotating the electric field with the gyrator 72. In that case, effective rotation of polarization will occur at three times the rate of rotation of the member 52 for the configuration thereof illustrated in the drawing.

In summary, according to the present invention, a novel radar antenna is provided that radiates a stationary pattern and receives a conical scan pattern. A minimum number of components are required to achieve the two modes of operation and the antenna automatically switches from one mode to the other without requiring additional control devices. The antenna thereby effectively overcomes the countermeasure's vulnerability heretofore attendant upon conical scan systems.

Furthermore, an improved radar system described above combines the advantages of monopulse radar and conical scan radar. The system transmits circularly polarized energy with the antenna described above and receives with a single antenna signals from two beams within the transmitted pattern. The antenna feed system is rotated to cause the received beams to rotate and thus scan through a conical pattern. The signals from the two beams can be applied simultaneously to conventional two-channel monopulse comparator and receiver circuits to determine object location and permit precise alignment of the antenna to determine azimuth and elevation of a tracked object. Alternatively, the two signals can be delivered to the receiver sequentially and combined on a time-sharing basis in a single channel system.

The radar system provides accurate target location in a minimum time and is substantially free from amplitude-varying noise problems. Another advantage of the system is the provision of rapid conical scanning over a wide pattern with fewer antennas and accessory components than heretofore required.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not a limiting sense.

It is also to be understood that the following claims are intended to cover all of the generic and specific features of the invention herein described, and all statements of the scope of the invention which, as a matter of language, might be said to fall therebetween.

What is claimed is:

1. An antenna system comprising, in combination, antenna means radiating a single stationary beam pattern during transmission of energy said antenna means including means for receiving first and second overlapping beams within said first pattern from reflections of said transmitted energy, first and second transmission paths arranged to be energized exclusively by signals in said first and second beams respectively, transmission means for coupling signals received by said antenna means to said transmission paths, and means for causing said overlapping beams to trace said directional pattern.

2. The combination defined in claim 1 including receiver means for combining the signals in said first and second transmission paths to develop a first voltage proportional to the sum of said signals and a second voltage proportional to the difference between said signals.

3. The combination defined in claim 1 including transmitter means delivering to said antenna during transmission energy having a rotating electric field.

4. The combination defined in claim 1 in which the pattern formed by said overlapping beams is a conical pattern.

5. An antenna system comprising, in combination, a directional antenna having means for illuminating a first single stationary pattern during transmission of energy having a rotating polarization and scanning a second pattern during reception of reflections of said transmitted energy, said second pattern being within said first pattern and having first hand second overlapping lobes, first and second feed means each of which is energized exclusively by signals received from one of said first and second lobes, and means for causing said lobes to rotate, thereby to trace said first pattern.

6. The combination defined in claim 5 in which said means for illuminating a first single stationary pattern during transmission of energy having a rotating polarization and scanning a second pattern during reception of reflections of said transmitted energy includes a member having a plurality of radiating elements disposed about the axis of said antenna, each of said elements being excited by energy having a different polarization angle.

7. The combination defined in claim 5 including means for propagating circularly polarized signals, said propagating means coupling signals received by said antenna from said means for illuminating a first single stationary pattern during transmission of energy having a rotating polarization and scanning a second pattern during reception of reflections of said transmitter energy to said feed means, said illuminating means being so coupled to said propagating means that each of said feed means is excited substantially only by signals having a selected polarization angle.

8. An antenna system comprising, in combination, an antenna having a reflector and a feed system therefor, said antenna being of the type which transmits in a conical pattern energy having a rotating electric field, said antenna including means for receiving reflections of said transmitted energy from first and second overlapping beams within said conical pattern, said receiving means assigning to each polarization of reflected energy a unique beam direction, first and second branch lines, means coupling the signals received from said first and second overlapping beams to said branch lines, each of said branch lines being primarily sensitive to energy having a selected polarization angle, ad scanning means for causing said first and second beams to trace said conical pattern.

9. The combination defined in claim 8 in which said feed system includes a radiating member disposed substantially at the focal point of said reflector, said radiating member having a plurality of resonant portions disposed about the axis of said reflector, and shorting means disposed to be actuated by energy being transmitted by said antenna and thereby render said portions nonresonant.

10. The combination defined in claim 9 including means for rotating said radiating member about said axis, 11. A radar system comprising, in combination, a transmitting and receiving antenna having a reflector and a feed system; said reflector having a focal point disposed on the axis thereof; means for coupling a transmitter to said feed system; said feed system having a member disposed substantially at the focal point of said reflector; said member having a plurality of polarization-sensitive radiating portions symmetrically arranged around said axis; said feed system being so constructed as to excite said member with energy delivered from said transmitter and thereby illuminate said reflector; a gaseous discharge device having a gas which is ionizable by energy transmitted by said antenna; said device being so disposed with respect to said member as to effectively render said member insensitive to polarization for polarizations perpendicular to said axis when said gas is ionized; a first branch line so coupled to said coupling means as to be excited exclusively by received signals having a first polarization angle; a second branch line so coupled to said coupling means as to be excited exclusively by received signals having a second polarization angle; and means for rotating said radiating member about said axis with respect to said transmission paths.

12. The combination defined in claim 11 in which said feed system comprises a transmission line protruding into said reflector, a rotary joint connecting said transmission line to said coupling means, a dielectric rod extending from said transmission line along said axis of said reflector, said radiating member and said discharge device being disposed on said rod, a second reflector disposed at the end of said rod remote from said transmission line and bearing means supporting said transmission line for rotation with respect to said coupling means; and in which said rotating means comprises a motor and means mechanically coupling said motor to rotate said transmission line, whereby said radiating member is rotated.

13. The combination defined in claim 11, having three equally spaced longitudinal slots in said radiating member, and in which said second polarization angle is orthogonal to said first polarization angle.

14. The combination defined in claim 13 including transmitter means connected to deliver circularly polarized energy to said coupling means, means for isolating the transmitter energy from said first and second branch lines, and a monopulse receiver connected to receive signals entering said branch lines from said coupling means.

15. The combination defined in claim 13 including transmitter means connected to deliver circularly polarized energy to said coupling means, means for isolating the transmitter energy from said first and second branch lines, a monopulse receiver having a single input port, and switching means connected intermediate said branch lines and said receiver input port.

16. An antenna comprising, in combination, means forming a plurality of polarization-sensitive radiating elements, feed means adapted to excite said elements with electromagnetic energy, said elements being so disposed that they are principally excited by energy having different polarization angles, and means actuated by energy transmitted by said antenna to effectively short circuit said elements.

17. The antenna defined in claim 16 including means for changing the orientation of said elements with respect to the polarization of received signals.

18. The combination defined in claim 16 in which said means for short-circuiting said elements comprises a gaseous discharge device.

19. A directional antenna system comprising, in combination, an antenna having a reflector, a radiating member having a plurality of resonant elements each of which is sensitive to energy having a different polarization angle, said radiating member being disposed substantially at the focal point of said reflector, and means actuable by energy transmitted by said antenna to effectively render said elements nonresonating.

20. The antenna defined in claim 19 in which said radiating member is a cylindrical member having a plurality of uniformly spaced axially disposed slots each of which is substantially an odd multiple of a quarter-wavelength long at the antenna operating frequency, and in which said means comprises a gaseous discharge device that ionizes and thereby effectively short circuits said slots when the energy level at said device exceeds a predetermined value.

21. An antenna system comprising, in combination, a reflector having a focal point disposed on a reflector axis of symmetry, transmission means protruding through said reflector and along said axis, a dielectric rod coupled to said transmission means and extending therefrom along said axis beyond said focal point, a second reflector disposed at the end of said rod remote from said transmission means, a cylindrical radiating member having a plurality of axial slots uniformly spaced on its circumference, said member being disposed coaxially around said rod and substantially at said focal point, and a gaseous discharge device adapted to ionize and thereby effectively short circuit said slots when energy is being transmitted by said antenna.

22. A directional antenna for transmitting energy in a conical pattern and for receiving reflection of said transmitted energy while conically scanning said pattern, said antenna comprising, in combination, a parabolic reflector having a focal point disposed on an axis of symmetry of said reflector, a circular waveguide protruding through said reflector along said axis, a dielectric rod coupled to said waveguide and extending therefrom along said axis beyond said focal point, a second reflector having first and second reflecting surfaces and disposed at the end of said rod remote from said waveguide, said first reflecting surface being disposed to reflect signals propagating within said rod, said second reflecting surface being disposed to reflect signals propagating along the surface of said rod, said first and second surfaces being spaced apart so that the signals reflected by them are substantially in phase at said focal point, a cylindrical radiating member having a plurality of axial slots each of which is substantially an odd multiple of a quarter-wavelength long at the operating frequency of said antenna, said slots being uniformly spaced a half-wavelength apart on the circumference of said member, said member being disposed around said rod substantially at said focal point, and a toroidal discharge tube containing gas that is ionized by energy being transmitted by said antenna, said tube being disposed around said rod to effectively short circuit said slots during transmission of energy by said antenna.

23. The combination defined in claim 22 in which said cylindrical radiating member has three slots.

24. The combination defined in claim 22 including transmitter means arranged to deliver energy having a rotating electric field to a waveguide, a receiver connected to said waveguide and means for isolating said receiver from energy delivered to said waveguide by said transmitter means.

* * * * *

PO-1050
(5/69)

UNITED STATES PATENT OFFICE
CERTIFICATE OF CORRECTION

Patent No. 3,618,091                  Dated November 2, 1971

Inventor(s) Jesse L. Butler

It is certified that error appears in the above-identified patent and that said Letters Patent are hereby corrected as shown below:

| | |
|---|---|
| Col. 1, line 6 | delete the letter "b" |
| Col. 2, line 7 | change "fee" to --free-- |
| Col. 3, line 42 | change "1" to --32-- |
| Col. 6, line 36 | after "not" add --in-- |
| Col. 6, line 70 | change "hand" to --and-- |
| Col. 7, line 29 | change "ad" to --and-- |

Signed and sealed this 6th day of March 1973.

(SEAL)
Attest:

EDWARD M. FLETCHER, JR.            ROBERT GOTTSCHALK
Attesting Officer                    Commissioner of Patents